United States Patent [19]

Blytas

[11] 4,036,944
[45] July 19, 1977

[54] HYDROGEN SORBENT COMPOSITION AND ITS USE

[75] Inventor: George C. Blytas, Houston, Tex.

[73] Assignee: Shell Oil Company, Houston, Tex.

[21] Appl. No.: 686,779

[22] Filed: May 17, 1976

[51] Int. Cl.$^2$ .................... C01B 1/32; C01B 1/35
[52] U.S. Cl. ............... 423/648 R; 252/428; 252/430; 423/248
[58] Field of Search .......... 423/648, 645, 248; 252/428, 430, 462

[56] References Cited
U.S. PATENT DOCUMENTS

| | | | |
|---|---|---|---|
| 2,929,792 | 3/1960 | Arnold et al. | 252/430 |
| 3,345,319 | 10/1967 | Colgan et al. | 252/430 X |
| 3,700,633 | 10/1972 | Wald et al. | 260/880 B |
| 3,793,435 | 2/1974 | Reilly et al. | 423/248 |
| 3,910,831 | 10/1975 | Helart | 252/462 |

FOREIGN PATENT DOCUMENTS 1,291,976  10/1972  United Kingdom ............ 423/648

Primary Examiner—Edward J. Meros
Attorney, Agent, or Firm—Dean F. Vance

[57] ABSTRACT

A hydrogen sorbent composition comprising a lanthanum pentanickel sorbent and a thermoplastic elastomer binder is disclosed. Also disclosed is the use of the composition in storing hydrogen and in the purification of hydrogen-containing streams.

10 Claims, 2 Drawing Figures

HYDROGEN SORBENT COMPOSITION AND ITS USE

BACKGROUND OF THE INVENTION

Hydrogen is an important product for refinery and chemical use. Therefore, it has become more important to recover hydrogen from gas mixtures and waste gas streams. Conventional technology for the recovery of hydrogen from hydrocarbon mixtures is based on cryogenic fractionation. This is a well-developed, fully-matured technology based on the expenditure of energy for the generation of the low temperatures required for fractionation of hydrogen/light hydrocarbon mixtures. With increasing costs of energy, it is essential to develop purification methods which are potentially less energy intensive. Such techniques would entail the use of a separating agent along with reduced quantities of energy, or low-grade, inexpensive energy, as for example waste heat.

One potential purification method is by employing a hydrogen sorbent, such as the sorbent alloys disclosed in British Pat. No. 1,291,976. The sorbent in the British patent is an alloy of elements A and D where A is calcium or a rare earth metal and D is nickel or cobalt. These sorbents readily form hydrides under appropriate conditions. Recently, alloys of the type $RM_5$ where R is a rare earth metal and M is a transition metal have been studied for their hydrogen absorption capacity. However, one of the basic problems with alloys of the type $RM_5$ is their tendency to pulverize upon repeated hydrogenation/dehydrogenation procedures. The continuously diminishing size of the alloy particles makes the use of such systems in either a fluidized or fixed-bed process commercially unacceptable due to excessively high pressure drop across the reactor bed resulting from the crushed particles. Further, the handling of such powder size alloys is dangerous since the powder form can be pyrophoric and the small particles can become lodged in the lungs. A means has now been found to reduce the attrition of a particularly desirable hydrogen sorbent alloy.

SUMMARY OF THE INVENTION

A solid hydrogen sorbent composition that combines excellent hydrogen sorption/desorption characteristics with an attrition resistant structure comprises a sorbent having greater than 50% lanthanum pentanickel alloy and a binder matrix selected from the group consisting of (i) non-hydrogenated block copolymers having at least two monoalkenyl arene polymer end blocks A and at least one elastomeric conjugated diene mid block B, and (ii) selectively hydrogenated block copolymers having at least two monoalkenyl arene polymer end blocks C and at least one substantially completely hydrogenated diene polymer mid block D.

DETAILED DESCRIPTION OF THE INVENTION

Figure 1:
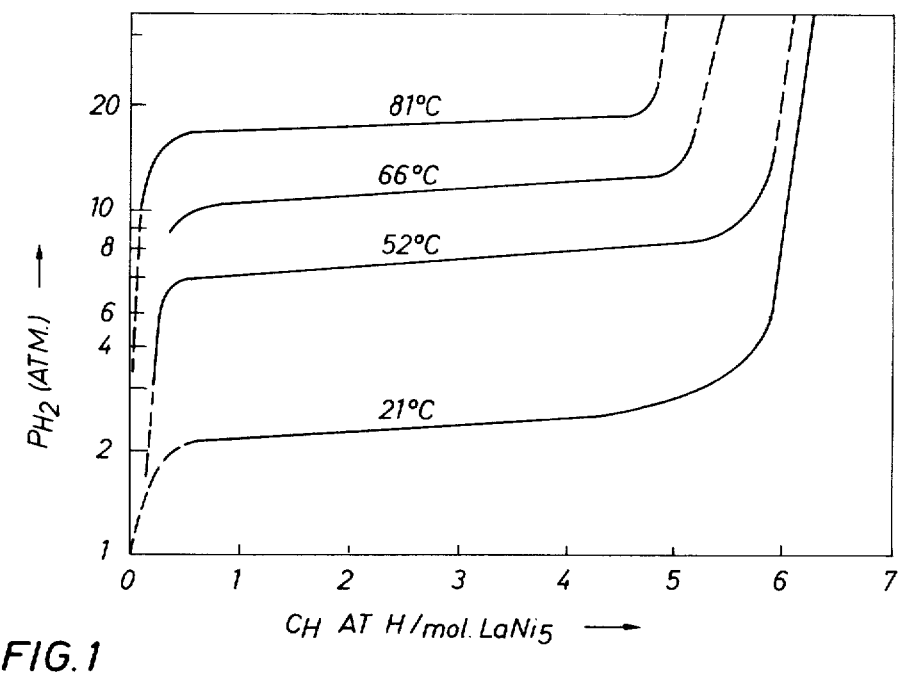

The principle component of the sorbent is the alloy lanthanum pentanickel ($LaNi_5$). The amount of lanthanum pentanickel should be greater than 50% by weight of the sorbent (less binder), preferably greater than 80% by weight. The lanthanum pentanickel can stoichiometrically absorb and desorb 3 moles of hydrogen per mole of the alloy.

The sorbent may also contain inert components and other hydride forming components. The inert components such as copper, nickel and iron are useful as heat sinks and heat moderators, and are also useful in minimizing the extent of expansion of the sorbent mass. The additional hydride forming components are preferably other rare earths and rare earth nickel compounds such as cerium, praseodymium, samarium and fluoro-nickel compounds. An attractive additional component is an inexpensive mixture of rare earth metals known as "Mischmetal" (Mm). Mischmetal is an impure mixture of rare earths containing about 50% w. cerium, 25% w. lanthanum along with other rare earths and metals such as iron, magnesium, calcium and the like. Mischmetal is obtained directly from the ore without separation and purification of the individual rare earths (R). One lanthanum-Mischmetal nickel system represented by the formula $LaMmNi_{10}$ ($La_{0.63}Co_{0.25}R_{0.12}Ni_5$) sorbed over 3 moles of hydrogen per mole sorbent at an equilibrium pressure of less than 400 psia.

As shown in the following illustrative embodiments, the lanthanum pentanickel alloy is not sufficiently attrition resistant to be commercially acceptable in either fixed bed or fluidized bed reactors. Accordingly, it has been found necessary to bind the alloy in a polymeric matrix that not only improves the attrition characteristics of the alloy, but also does not diminish the hydrogen sorption/desorbtion capacity of the alloy.

The binders in the instant invention are thermoplastic elastomers having a block copolymer structure. The block copolymers employed must have at least two monoalkenyl arene polymer end blocks A and at least one elastomeric conjugated diene polymer mid block B. The number of blocks in the block copolymer is not of special importance and the macromolecular configuration may be linear, graft or radial (branched) depending upon the method by which the block copolymer is formed. Typical block copolymers of the most simple configuration would have the structure polystyrene-polyisoprenepolystyrene and polystyrene-polybutadiene-polystyrene. A typical radial polymer would comprise one in which the diene block has three or more branches, the tip of each branch being connected to a polystyrene block. See U.S. Pat. No. 3,594,452. Expressed another way, the invention also contemplates (but is not limited to) the use of configurations such as A—B—(B—A)$_n$ where $n$ varies from 1 to 5. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene.

The average molecular weights of each of the blocks may be varied as desired. The monoalkenyl arene polymer blocks preferably have average molecular weights between about 5,000 and about 125,000, more preferably between about 15,000 and about 100,000. The elastomeric conjugated diene polymer blocks preferably have average molecular weights between about 15,000 and about 250,000, more preferably between about 25,000 and about 150,000. The average molecular weights of the polystyrene end blocks are determined by gel permeation chromotography, whereas the polystyrene content of the polymer is measured by infrared spectroscopy of the finished block polymer. The weight percentage of the thermoplastic monoalkenyl arene blocks in the finished block polymer should be between about 8 and 55%, preferably between about 10% and about 30% by weight. The general type and preparation of these block copolymers are described in U.S. Pat. Re. No. 28,246 and in many other U.S. and foreign patents.

Preferably, the block copolymers employed in this invention are the block copolymers described above which have been hydrogenated either selectively, randomly or completely. Hydrogenation of the precursor block copolymers is preferably affected by use of a catalyst comprising the reaction products of an aluminum alkyl compound with nickel or cobalt carboxylates or alkyloxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bond are hydrogenated and less than 5% of the aromatic double bonds are hydrogenated. See generally U.S. Pat. No. 3,595,942. When the diene employed is butadiene, it is preferred that polymerization conditions be adjusted to result in a polymer block having from about 25 to 60% 1,2 structure. Thus, when such a block is hydrogenated, the resulting product is, or resembles, a regular copolymer block of ethylene and butene-1. If the conjugated diene employed is isoprene, the resulting hydrogenated product is or resembles a regular copolymer block of ethylene and propylene. Of course, direct synthetic preparation may be employed involving block polymerization of monoalkenyl arene with alpha-olefin mixtures resulting in block copolymers similar to those described above. The claims will be understood to include block copolymers prepared by this direct procedure as well as by the hydrogenation process.

It is likely that when a non-hydrogenated block copolymer is employed, the binder will become at least partly hydrogenated during the hydrogen sorption cycles. It is also possible that even when employing a selectively hydrogenated block copolymer as a binder that the arene portion of the binder may become saturated during the hydrogen sorption cycle. However, this subsequent hydrogenation is not likely to affect the ability of the binder to prevent the attrition of the alloy particles.

The binder may comprise either a neat block copolymer or a blend of block copolymer with other thermoplastics, resins, extending oils, and fillers. A preferred binder composition comprises a selectively hydrogenated block copolymer, polypropylene, and an extending oil. Typical blending components and amounts are disclosed in U.S. Pat. No. 3,639,163. While other elastomers, such as natural rubber, styrene-butadiene rubbers, polybutadiene rubber and the like might possibly be used as the binder, they are not as useful as the present block copolymers.

The sorbent and the binder may be comgined in any acceptable form including pellets and particles. The resulting composition comprises about 1-30% by weight binder and 99-70% by weight sorbent. Preferred amounts are 2-15% by weight binder and 98-85% by weight sorbent. One method comprises mixing the sorbent and binder, and molding the articles by heating to the softening point of the binder. A preferred means for forming the pellets is to dissolve the binder in a solvent, such as toluene, cyclohexane, n-butyl benzene and the like at elevated temperatures such as about 70°–130° C. The solvent is then recovered at about 130°–170° C under reduced pressure. The resulting paste may then be pelletized at 170°–200° C and 10,000 to 40,000 psig for about 1 to 10 minutes. If desired, the resulting pellets could be ground to a small particle size. It is also possible to increase the cohesion between the alloy and binder, and facilitate the intermixing of the alloy/solvent-binder system, by prewetting the alloy powder with an alcohol such as methanol before mixing with the binder/solvent phase. In addition, small amounts of silicone fluid added to the composite tend to reduce the tendency of small particles or pellets to become "tacky" after repeated cycling. Additional vacuum drying after pelletization or grinding also helps in that regard, by removing excess solvent. Small particles, rather than pellets, can be obtained by grinding (rather than pelletizing) the pre-frozen (liquid nitrogen) composite phase.

It is significant that the binder employed herein does not diminish the capacity of the alloy sorbent to absorb and desorb hydrogen. One possible reason for this surprising affect may be that the block copolymer does not totally encapsulate the sorbent alloy particles. It is also possible, however, that the hydrogen can permeate the block copolymer binder.

The capacity of the sorbent of the instant invention to absorb or render hydrogen gas depends upon the external hydrogen gas pressure and the working temperature. FIG. 1 relates to the hydrogen absorption of the lanthanum pentanickel alloy wherein the hydrogen gas pressure $P_{H_2}$ is plotted on the y axis and the absorbed quantity of hydrogen $C_H$ on the x axis. Each isotherm (provided it is associated with a temperature lying below a critical temperature $T_K$) exhibits a horizontal course at a given pressure — the so-called "plateau". At the plateau pressure, the material can be caused with the aid of a small pressure variation to absorb or release in a reversible process, considered volumes of hydrogen gas. The "working temperature" is the temperature at which a suitable plateau pressure is obtained.

An efficient method for employing an absorption/-desorption process is a nearly isothermal process wherein the sorbent-binder matrix is subjected to a hydrogen gas pressure at a given temperature, and then the stored hydrogen gas is released from the sorbent-binder matrix by reducing the hydrogen gas pressure, preferably to a value which is lower than the plateau pressure at essentially the same temperature. The temperature is kept nearly constant by removing heat during sorption and adding heat during desorption. Another less preferred process is a thermal-swing system wherein the hydrogen is absorbed at low temperature and desorbed at a higher temperature. However, this process has higher heating and cooling requirements. A third mode of operation is a modified isothermal process wherein a moderate thermal swing is permitted to allow hydrogen desorption at relatively higher pressure.

In the hydrogen recovery and purification process, the temperature is typically between about 0° C and 150° C, preferably between about 30° C and 120° C. The top limit of 150° C is necessary since the binder becomes excessively fluid at higher temperatures. The pressure typically varies from about 10 psia to about 2,000 psia. However, these pressure ranges are not limiting. The time required in order to reach equilibrium can easily be determined experimentally and is not critical to practising the instant invention.

Illustrative but not limiting conditions for the "isothermal" mode could be an operating temperature of about 66° C and a pressure of the recovered hydrogen of about 100 psia. Illustrative but not limiting conditions for the "moderate thermal swing" mode could be sorption temperature of about 52° C, desorption temperature of about 100° C, and pressure of recovered hydrogen of about 260 psia.

There are two principle uses for the sorbent-binder matrix of the instant invention. First, the matrix may be employed to store hydrogen. This use is not a severe use since there are less frequent sorption/desorption cycles and since typically there are no poisons present. The second use is in recovering hydrogen from gaseous streams such as refinery waste gas streams and the like. This is a fairly severe use due to the need for frequent sorption/desorption cycles and the presence of poisons such as oxygen, water vapor, carbon monoxide, and carbon dioxide.

When employed in gas purification processes, the sorbent-binder matrix of the instant invention may be employed either in a fixed bed or a fluidized bed. When employed in a fixed bed, the sorbent matrix is typically employed in pellet form. In a fluidized bed, the sorbent matrix is typically employed in particle form.

DETAILED DESCRIPTION OF THE DRAWING

FIG. 1 shows four pressure-composition isotherms for lanthanum pentanickel alloys. These isotherms were taken from Dutch Pat. No. 6,906,305.

Figure 2:
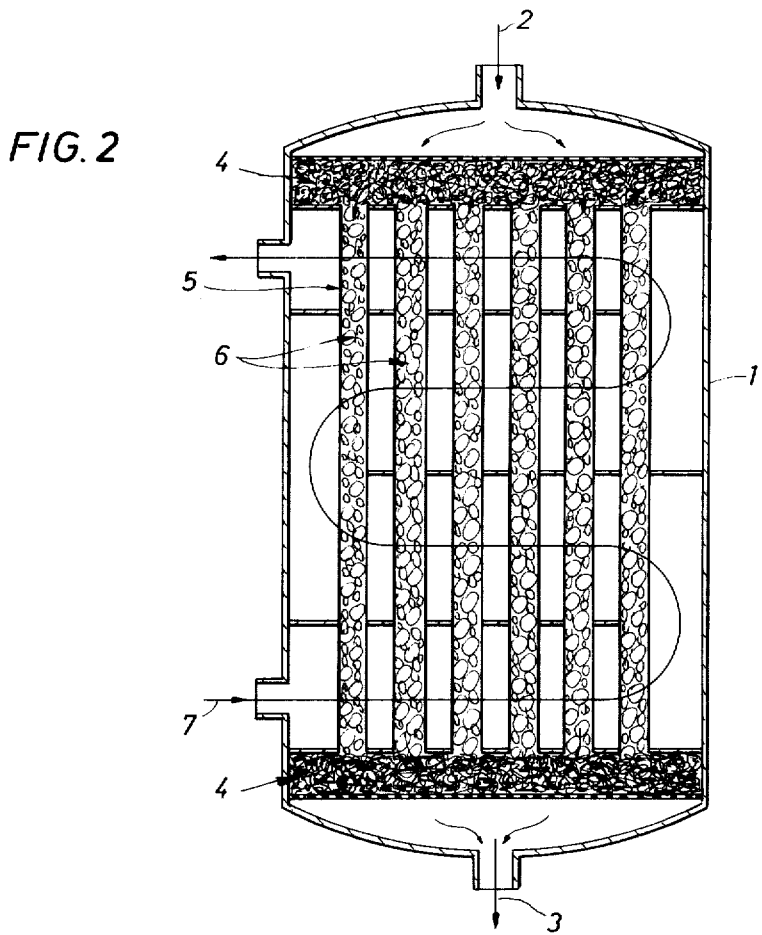

FIG. 2 discloses a typical fixed bed vessel suitable for use in the selective absorption of hydrogen from a feed gas stream. The reactor vessel 1 has both a feed inlet 2 and a product outlet 3. Supports such as ceramic balls 4 are loaded on the ends of the reactor tubes 5. These reactor tubes are loaded with the sorbent-binder composition 6. Cooling water or stream 7 flows around the reactor tube so as to maintain nearly isothermal conditions. Once the sorbent has reached equilibrium and the sorbent can no longer effectively sorb the hydrogen, the feed gas stream is typically switched to another reactor. Then the pressure is reduced in the first reactor, and the hydrogen gas is desorbed and removed.

The invention is further illustrated by means of the following illustrative embodiments, which are given for the purpose of illustration only and are not meant to limit the invention to the particular reactants and amounts disclosed.

ILLUSTRATIVE EMBODIMENT I

An important criterion in selecting a hydrogen sorbent is the exothermic heat of absorption. The magnitudes of heat of absorption are as follows:

|        | K cal/mole $H_2$ |
|--------|------------------|
| FeTi   | −5.5             |
| $LaNi_5$ | −7.0           |
| V      | −9.6             |
| $MgNi_2$ | −15.4          |
| Mg     | −17.8            |
| Ca     | −41.7            |
| Li     | −43.3            |
| Ce     | −49.2            |

The high exothermicity of Ca, Li and Ce means that a large amount of thermal energy has to be fed into the hydride at high temperatures to bring about desorption of hydrogen. Also of consideration, Mg systems entail higher temperatures of sorption and desorption than the other noted systems.

Further, V and $LaNi_5$ are thermodynamically superior to FeTi for hydrogen recovery applications because in the FeTi system hydride formation at ambient temperature requires higher $H_2$ pressures. Thus, at 40° C, the V metal sorbs $H_2$ at 50 psia, $LaNi_5$ at 65 psia, and FeTi at 110 psia.

ILLUSTRATIVE EMBODIMENT II

The rates of hydrogen sorption on $LaNi_5$ powders (no binder matrix; powder less than 140 mesh size) at 25° C are summarized in Table 1. In Table 1, Runs A and B were run with an initial pressure of about 300 psia while Runs C and D were run with an intial pressure of about 150 psia. In Runs A and C, the heat of sorption was removed by immersion in a water bath, whereas, in B and D, no special precautions were taken to remove the heat of reaction. Thus, Runs A and C are more nearly isothermal (at 25° C) then Runs B and D.

The results of desorbing $LaNi_5$ hydrides at 65° C and 100° C are presented in Table 2. The hydrogen content at the end of desorption in these two runs are about 0.6 atom/mole of $LaNi_5$.

Table 1

| | | Rates of $H_2$ Sorption on $LaNi_5$ Powders at 25° C | | | | | | |
|---|---|---|---|---|---|---|---|---|
| | Initial | Extent of Sorption, % | | | | | | |
| Run | Conditions | 1 Min | 3 Min | 5 Min | 10 Min | 20 Min | 30 Min | Final Conditions |
| (A) | 290 psia | 76.3 | 92.3 | 95.7 | 98.5 | 100 | — | 62 psia 3.21 $H_2$/$LaNi_5$ |
| (B) | 290 psia | 76.7 | 90.5 | 92 | 96.3 | 100 | — | 74 psia 3.06 $H_2$/$LaNi_5$ |
| (C) | 149 psia | 62 | 88.5 | 93 | 97.5 | 100 | — | 80 psia 2.7 $H_2$/$Lani_5$ |
| (D) | 140 psia | 65 | 86.5 | 88 | 92 | 96.6 | 100 | 89 psia 2.36 $H_2$/$LaNi_5$ |

Table 2

| Rates of Desorption at 65 and 100° C | | | | | | | | |
|---|---|---|---|---|---|---|---|---|
| Temperature | Time (Min) | 0.5 | 1 | 2 | 5 | 10 | 20 | End Pressure |
| 65° C | | 55.5 | 64.3 | 75 | 86.7 | 90.3 | 91.3 | 130 psia |
| 100° C | | 82.3 | 91 | | | | 91 | 186 psia |

ILLUSTRATIVE EMBODIMENT III

The selectivity of $LaNi_5$ for $H_2$/$CH_4$ separations was determined in a static experiment at 0° C. A feed mixture of 70 psia $H_2$ and 630 psia $CH_4$ was contacted with $LaNi_5$. The $LaNi_5$ sorbed over 70% of the $H_2$ present to an end pressure of about 20 psia $H_2$ and 630 psia $CH_4$. The gas composition was determined by GLC. No $CH_4$ sorption could be detected. At the end of the experiment, the alloy contained 3 moles $H_2$/mole of $LaNi_5$. The rates of $H_2$ sorption were not adversely affected by the presence of methane. It has also been shown that the presence of $H_2O$, $O_2$, $CO_2$ and small amounts of CO do not hinder the hydrogen sorption of $LaNi_5$.

ILLUSTRATIVE EMBODIMENT IV

Pellets of 97% weight $LaNi_5$ and a 3% block copolymer composition binder were prepared. The binder comprised a selectively hydrogenated S—EB—S block copolymer also having polypropylene and oil components. This binder is commercially available from Shell Chemical Company under the tradename KRATON G Thermoplastic Rubber. About a 10% by weight solution of KRATON G in a n-butyl benzene solvent was added to the $LaNi_5$ powder at 120°–130° C. The solvent was then recovered at 140°–150° C under reduced pressure, and the resulting paste was pelletized at 170°–180° C; 30,000 psia; and 5 minutes. The pellets were cylinders about 0.5 cm in diameter. These pellets were than made into small particles by cryogenic grinding. A fraction of the composite sample containing 44 to 100 $\mu$ (micron) particles was subjected to 100 hydrogenation-dehydrogenation cycles between 25° and 120° C. A size determination at the end of these runs showed that the $> 88 \mu$ fraction attrited by about 0.12%/cycle, whereas the $> 44 \mu$ fraction attrited by 0.06%/cycle. It is possible that part of this attrition represents particle shrinkage due to loss of solvent from the polymer phase. On the other hand, free alloy powder samples (without binder) of a 88–100 $\mu$ size were reduced to less than 44 $\mu$ after less than six cycles. This shows that the reduction in attrition brought about by binding with the instant invention elastomeric compositions is substantial. Also significant, after 100 cycles the capacities and rates of the composite particle samples ($LaNi_5$ plus instant binder) were the same as those exhibited by fresh $LaNi_5$ powders.

Other binders were considered and found to be unsatisfactory. Inorganic binders studied were silicic acid (commercial "water glass") and various low melting alloy compositions. These systems were unsatisfactory; for example, a pellet made by binding $LaNi_5$ powder with 15% w. water glass and compressed under 40,000 psia was completely pulverized by a single room temperature hydrogenation. Similarly, various formulations, in which low melting tin or lead (20–40% w.) and their alloys were used either as binders of pure $LaNi_5$ powders or as binders of $LaNi_5$/Cu powder mixtures, were unsuccessful. The copper powder addition (up to 50% w.) was tried as a means of reducing the effect of volume expansion of $LaNi_5$. The resulting phases upon hydrogenation expanded over 4%, and after two cycles of hydrogenation they disintegrated.

Some experiments with organic binders were made with polypropylene and polystyrene. These were made as follows: The polymers were dissolved in butylbenzene, mixed with $LaNi_5$ powders, the solvent was removed by evaporation, the resulting "paste" was pelletized under pressure (10,000–40,000 psia) and the last traces of the solvent were recovered. Samples with 2–5% w. polymer were used in 95–98% w. metal. These systems behaved somewhat better than the inorganic-binder systems in that they did not disintegrate upon hydrogenation. However, the mechanical properties of the pellets rapidly deteriorated upon repeated cyclic sorption/desorption.

ILLUSTRATIVE EMBODIMENT V

In this embodiment the reactor shown in FIG. 2 is employed to selectively remove hydrogen from a feed gas stream. The loading in the reactor bed is listed in Table 3. The void refers to the portion filled with graded ceramic support balls.

In case 1, the feed stream has about 73% hydrogen in the feed, whereas in case 2 the feed stream has about 52% hydrogen in the feed. In both cases, sorption and desorption are carried out at about 66° C. The results are presented below in Table 4. In each case, the product hydrogen purity was about 99% at a recovery of 95%.

Table 3

| Data Type | $LaNi_5$ | Polymer | Sorbent | Void | Bed |
|---|---|---|---|---|---|
| % Weight of Sorbent-Binder Composition | 95 | 5 | 100 | | |
| % Volume of Sorbent-Binder Composition | 70 | 30 | 100 | | |
| Density, lb/ft$^3$ | 516 | 62.4 | 378 | | 235 |
| Bed Volume Fraction | 0.455 | 0.195 | 0.65 | 0.35 | 1.0 |

Table 4

| Case | 1 | | | 2 | | |
|---|---|---|---|---|---|---|
| Stream Name | Feed Gas | $H_2$ Product | $CH_4$ Product | Feed Gas | $H_2$ Product | $CH_4$ Product |
| Component (moles) | | | | | | |
| $H_2$ | 733 | 697 | 36 | 523 | 496.8 | 26.3 |
| $N_2$ | 10 | 0.2 | 10 | 40 | 0.9 | 39 |
| $CH_4$ | 249 | 3.7 | 245 | 293 | 6 | 287 |
| $C_2H_6$ | 8 | 0.1 | 8 | 133 | 3 | 130 |
| $C_3H_8$ | 0 | 0 | 0 | 11 | 0.2 | 10.8 |
| Total | 1,000 | 701 | 299 | 1,000 | 506.9 | 493.1 |

What is claimed is:

1. A solid hydrogen sorbent composition comprising a sorbent having greater that 50% lanthanum pentanickel alloy and a binder matrix selected from the group consisting of (i) non-hydrogenated block copolymers having at least two monoalkenyl arene polymer end blocks A and at least one elastomeric conjugated diene mid block B, and (ii) selectively hydrogenated block copolymers having at least two monoalkenyl arene polymer end blocks C and at least one substantially completely hydrogenated diene polymer mid block D.

2. A composition according to claim 1 wherein the hydrogen sorbent composition comprises about 99% to about 70% by weight sorbent and about 1% to about 30% by weight binder.

3. A composition according to claim 1 wherein said binder is a selectively hydrogenated block copolymer wherein at least 80% of the aliphatic double bonds are hydrogenated while no more than about 25% of the aromatic bonds are hydrogenated.

4. A composition according to claim 1 wherein said sorbent comprises at least about 80% lanthanum pentanickel with the remainder being selected from the group consisting of copper, nickel and iron metals.

5. A composition according to claim 1 wherein said sorbent comprises lanthanum pentanickel and Mischmetal.

6. A composition according to claim 1 wherein said hydrogen sorbent composition comprises about 45% by weight lanthanum pentanickel alloy, about 45% by weight copper metal, and about 10% by weight binder.

7. A process for absorbing and subsequently desorbing hydrogen gas in and from the solid hydrogen sorbent composition of claim 1 which process comprises:
   a. subjecting said solid hydrogen sorbent composition to an external hydrogen gas pressure which exceeds the plateau pressure at the absorption temperature; and
   b. reducing the hydrogen gas pressure to which said solid hydrogen sorbent composition is subjected to a value which is lower than the plateau pressure at the desorption temperature.

8. A process according to claim 7 wherein the absorption temperature and desorption temperature varies between about 0° C and 150° C.

9. A process according to claim 8 wherein the external hydrogen gas pressure and the hydrogen gas pressure varies from about 10 psia to about 2,000 psia.

10. A process according to claim 7 wherein said hydrogen sorbent composition comprises about 99% to about 70% by weight sorbent and about 1% to about 30% by weight binder.

* * * * *